Patented Apr. 8, 1924.

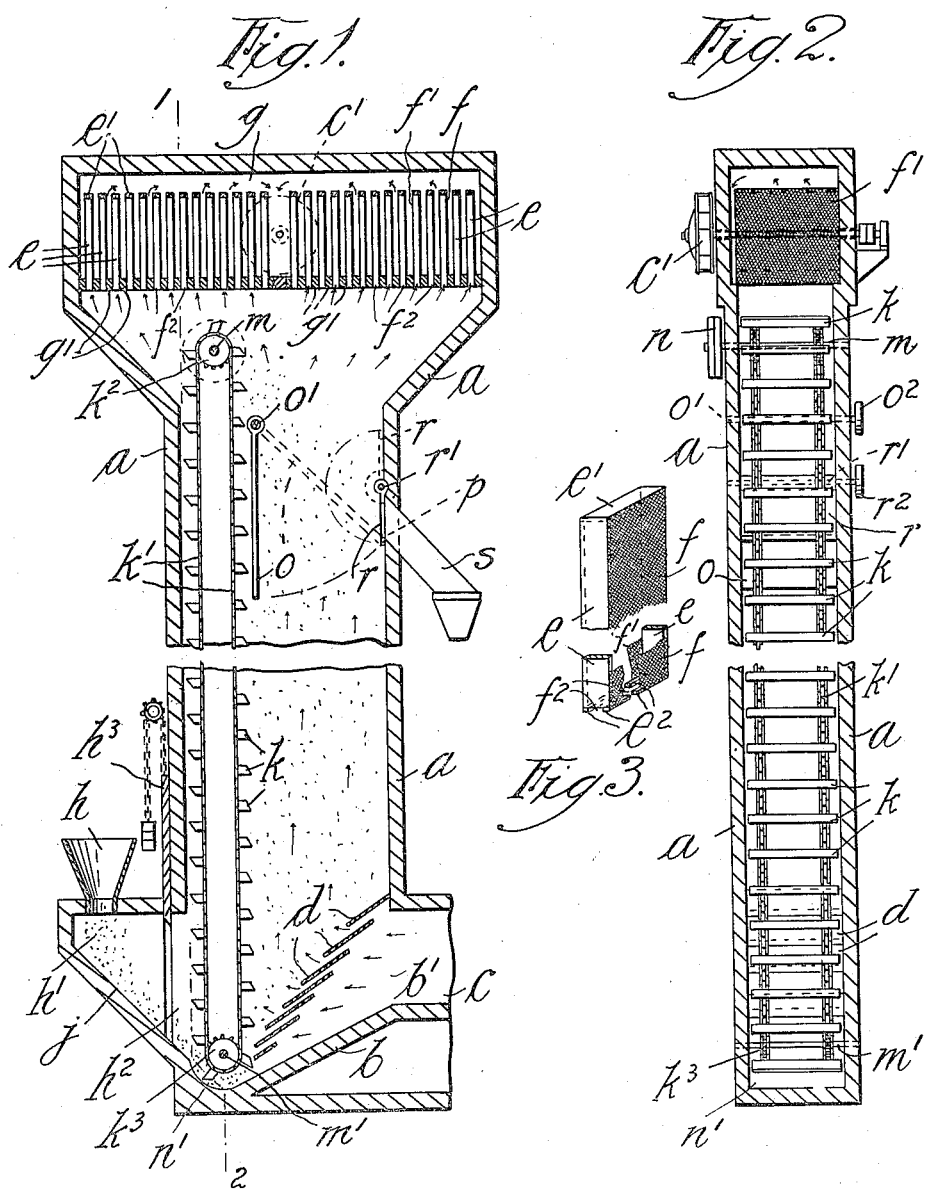

1,489,846

UNITED STATES PATENT OFFICE.

JOSEPH O'CONNELL AND HAROLD HAMILTON KERR, OF KENSINGTON, VICTORIA, AUSTRALIA.

APPARATUS FOR DRYING DISINTEGRATED MATERIAL.

Application filed August 30, 1921. Serial No. 496,866.

*To all whom it may concern:*

Be it known that we, JOSEPH O'CONNELL and HAROLD HAMILTON KERR, subjects of the King of Great Britain, residing at Macaulay Road, Kensington, in the State of Victoria, Australia, have invented certain new and useful Improvements in Apparatus for Drying Disintegrated Material; and we do declare the following to be a full, clear, and exact description of the invention, such as will enable others skilled in the art to which it appertains to make and use the same.

This invention has been devised to provide a method of and means for drying disintegrated material. The material during treatment falls some distance within a vertical structure or tower from a delivery point during which it meets a current of hot air of a desired temperature. Such air as it ascends within the structure thoroughly intermingles with the falling material causing the moisture or most of it to be absorbed, whichever desired. The material should receive preferably continuous treatment for a desired period, i. e., according to the quality of material and dryness required. Provision is made for a continuous discharge intermittently whereby the material is delivered at a point for collection.

In order that our invention may be the more easily understood reference will be made to the accompanying sheet of drawings in which—

Figure 1 is a side sectional elevation showing apparatus embodied in our invention.

Figure 2 is a section on line 1—2 of Figure 1 whilst

Figure 3 shows in section the manner of constructing the screen members hereinafter referred to.

We provide a towerlike structure $a$ of suitable material and supported in any convenient manner. The structure may be of any desired height according to requirements. Close to the floor $b$ which is inclined, but on one side of said structure is an opening $b'$ at the rear of which a chamber $c$ is disposed. This chamber is connected to any suitable source of heat. On the exterior of said tower and preferably at the top thereof in a central position is a suitable rotary fan $c'$ with a suction effect to provide and draw a draught of air from the heating element through the opening $b'$ into the structure or tower $a$, where it meets a number of baffle or director plates $d$ of a desired configuration and preferably arranged diagonally to evenly distribute throughout the tower the air as it ascends. On reaching a point close to the top of the tower the air meets a number of vertically disposed screens, constructed of framework comprising solid ends $e$ and top $e'$ with bottom slats $e^2$, the material being attached at the sides of the frame to provide two parallel sides $f$ $f'$ with an opening $f^2$ between the slats $e^2$, the top being closed as stated before by the flat plate $e'$. The screens occupy nearly the full width of the upper portion $g$ of the tower $a$ and are arranged at intervals apart, the intervening space at the lower portion being closed by cross plates $g'$. This arrangement compels the air during its circulation to enter the opening $f^2$ between the slats $e^2$ and pass through the screening material to the fan $c'$. During its circulation after passing through the screens a portion of the air passes into the space above the screens thence to the fan $c'$ whilst another portion passes directly to the screens. The screening material is preferably fabric woven to provide a mesh which will prevent egress of the material during treatment, but at the same time allows the air to freely circulate through on its way to the suctional or exhaust fan $c'$. The material for treatment is fed into the hopper $h$ preferably in a finely disintegrated condition. From the hopper it falls into the compartment $h'$ having an opening $h^2$ for exit purposes, a vertical sliding door $h^3$ closes such opening $h^2$ when required. The floor $j$ of the compartment $h$ in inclined, the angle being such that the material continues to pass downwardly and through the opening $h^2$ where it meets the buckets $k$ of a suitable elevator or conveyor disposed at one side of the tower $a$, and such conveyor preferably consisting of the usual sprocket chain $k'$ running on upper and lower sprocket wheels $k^2$ and $k^3$ on shafts $m$ $m'$, the sprocket chains receiving motion through driving pulley $n$ on the shaft $m$. The material is conveyed by the buckets $k$ to the upper portion of the tower $a$ below the screens where it is discharged from the buckets $k$ as they make the turning or tipping movement. The material falling the full length of the tower into the trough $n'$ to be again removed by the buckets $k$. During its descent it meets the ascending air whose temperature is regulated to provide the required degree of heat so that the material as it falls will be dried as desired, the pressure of the ascending hot air is also adjusted so that it will not impede the material whilst falling. On the material receiving a predetermined treatment an adjustable chute $o$ suspended on the shaft $o'$ with actuating pulley $o^2$, is actuated and set at an angle to close the tower against the falling material as it is discharged from the buckets. The material now passes down the chute $o$ to an opening $p$ in the wall of the tower $a$, such opening $p$ being closed during the treatment by a flap door $r$ on the shaft $r'$ with actuating pulley $r^2$. The material when the door $r$ is raised as shown in dotted lines passes through the opening $p$ into a delivery chute $s$.

We would have it understood that we do not arbitrarily confine ourselves to the hereinbefore mentioned arrangement of parts as same may be amplified or modified without departing from the ambit of our invention.

We claim:

1. An apparatus for drying disintegrated material comprising a tower having a receiving compartment provided with an inclined floor and an air inlet opening, a sliding door adapted to close the said inlet opening, a bucket conveyor within the tower, a plurality of baffle plates set at an angle in the tower adjacent said air inlet opening to evenly distribute air as the same enters the tower, a fan placed on the exterior of the tower for circulating the air, and a plurality of screens disposed and arranged within the tower to provide spaces having a lower opening and a closed top for air filtration purposes, the air during its circulation being directed to and passing through the said screens.

2. An apparatus for drying disintegrated material comprising a tower having a receiving compartment provided with an inlet opening and a discharge opening, a sliding door for the said inlet opening, a bucket conveyor within tthe tower, an adjustably suspended director chute, a flap door normally covering said discharge opening, and a delivery chute extending from said discharge opening.

In testimony whereof we have signed our names to this specification in the presence of two subscribing witnesses.

JOSEPH O'CONNELL.
HAROLD HAMILTON KERR.

Witnesses:
AUGUSTINE THOMAS MADDEN,
IVY DONOHUE.